US009673670B2

(12) United States Patent
Kurbegovic-Zrnic et al.

(10) Patent No.: US 9,673,670 B2
(45) Date of Patent: Jun. 6, 2017

(54) METHOD FOR PRODUCING A ROTOR AND ELECTRIC MACHINE HAVING A ROTOR

(71) Applicant: BROSE FAHRZEUGTEILE GMBH & CO. KOMMANDITGESELLSCHAFT, WUERZBURG, Wuerzburg (DE)

(72) Inventors: Jasmin Kurbegovic-Zrnic, Wuerzburg (DE); Christian Schumpa, Grosslangheim (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 233 days.

(21) Appl. No.: 14/548,867

(22) Filed: Nov. 20, 2014

(65) Prior Publication Data

US 2015/0137649 A1 May 21, 2015

(30) Foreign Application Priority Data

Nov. 20, 2013 (DE) .................. 10 2013 019 318

(51) Int. Cl.
*H02K 1/27* (2006.01)
*H02K 15/03* (2006.01)
*H02K 16/02* (2006.01)

(52) U.S. Cl.
CPC ............. *H02K 1/276* (2013.01); *H02K 15/03* (2013.01); *H02K 16/02* (2013.01); *Y10T 29/49012* (2015.01)

(58) Field of Classification Search
CPC ........ H02K 15/03; H02K 16/02; H02K 1/276; Y10T 29/49012

USPC ..................................................... 310/156.53
See application file for complete search history.

(56) References Cited

U.S. PATENT DOCUMENTS

| 6,008,559 | A | * | 12/1999 | Asano | .................. | H02K 1/2766 |
| | | | | | | 310/156.53 |
| 7,103,961 | B2 | | 9/2006 | Fujita | | |
| 7,960,885 | B2 | | 6/2011 | Mizutani et al. | | |
| 9,257,874 | B2 | | 2/2016 | Haga et al. | | |
| 2002/0145353 | A1 | * | 10/2002 | Kimura | ................. | H02K 1/276 |
| | | | | | | 310/156.57 |
| 2006/0017419 | A1 | * | 1/2006 | Tajima | .................. | B60L 15/025 |
| | | | | | | 318/801 |

(Continued)

FOREIGN PATENT DOCUMENTS

| CN | 101657950 A | 2/2010 |
| CN | 103141010 A | 6/2013 |

(Continued)

*Primary Examiner* — Alex W Mok
(74) *Attorney, Agent, or Firm* — Laurence A. Greenberg; Werner H. Stemer; Ralph E. Locher

(57) ABSTRACT

A method produces a rotor which can rotate about a rotation axis, in particular for an electrical machine of a motor vehicle. At least two rotor body elements are each provided with a number of receiving pockets which are made in an axial direction. Magnet bodies are in each case pressed into the receiving pockets in the rotor body elements with an axial press-in direction. The rotor body elements are joined to one another in such a way that the press-in directions of the magnet bodies point away from one another. Additionally, an electrical machine has a rotor which is produced in this manner.

11 Claims, 1 Drawing Sheet

(56) References Cited

U.S. PATENT DOCUMENTS

| | | | | |
|---|---|---|---|---|
| 2009/0309449 | A1* | 12/2009 | Tajima | B60L 15/025 310/156.38 |
| 2013/0002082 | A1* | 1/2013 | Utsumi | H02K 1/276 310/156.53 |
| 2013/0038163 | A1* | 2/2013 | Kim | H02K 1/276 310/156.16 |
| 2013/0069468 | A1* | 3/2013 | Nakamura | H02K 1/28 310/156.19 |
| 2013/0257211 | A1* | 10/2013 | Haga | H02K 1/278 310/156.12 |
| 2013/0270956 | A1* | 10/2013 | Yamaguchi | H02K 1/27 310/156.27 |
| 2013/0285500 | A1* | 10/2013 | Kinashi | H02K 1/276 310/156.53 |

FOREIGN PATENT DOCUMENTS

| | | | |
|---|---|---|---|
| CN | 103339830 A | 10/2013 | |
| DE | 102006052772 A1 | 9/2007 | |
| DE | 102008041555 A1 | 3/2010 | |
| DE | 102010041015 A1 | 3/2012 | |
| JP | WO 0227893 A1 * | 4/2002 | H02K 1/276 |
| JP | 2002191143 A | 7/2002 | |
| JP | 2006230061 A | 8/2006 | |
| JP | 3869731 B2 | 1/2007 | |
| JP | 2011005738 A | 1/2011 | |
| KR | 1020100109693 A | 10/2010 | |
| WO | 2007107136 A1 | 9/2007 | |
| WO | 2012038377 A2 | 3/2012 | |
| WO | 2012137465 A1 | 10/2012 | |

\* cited by examiner

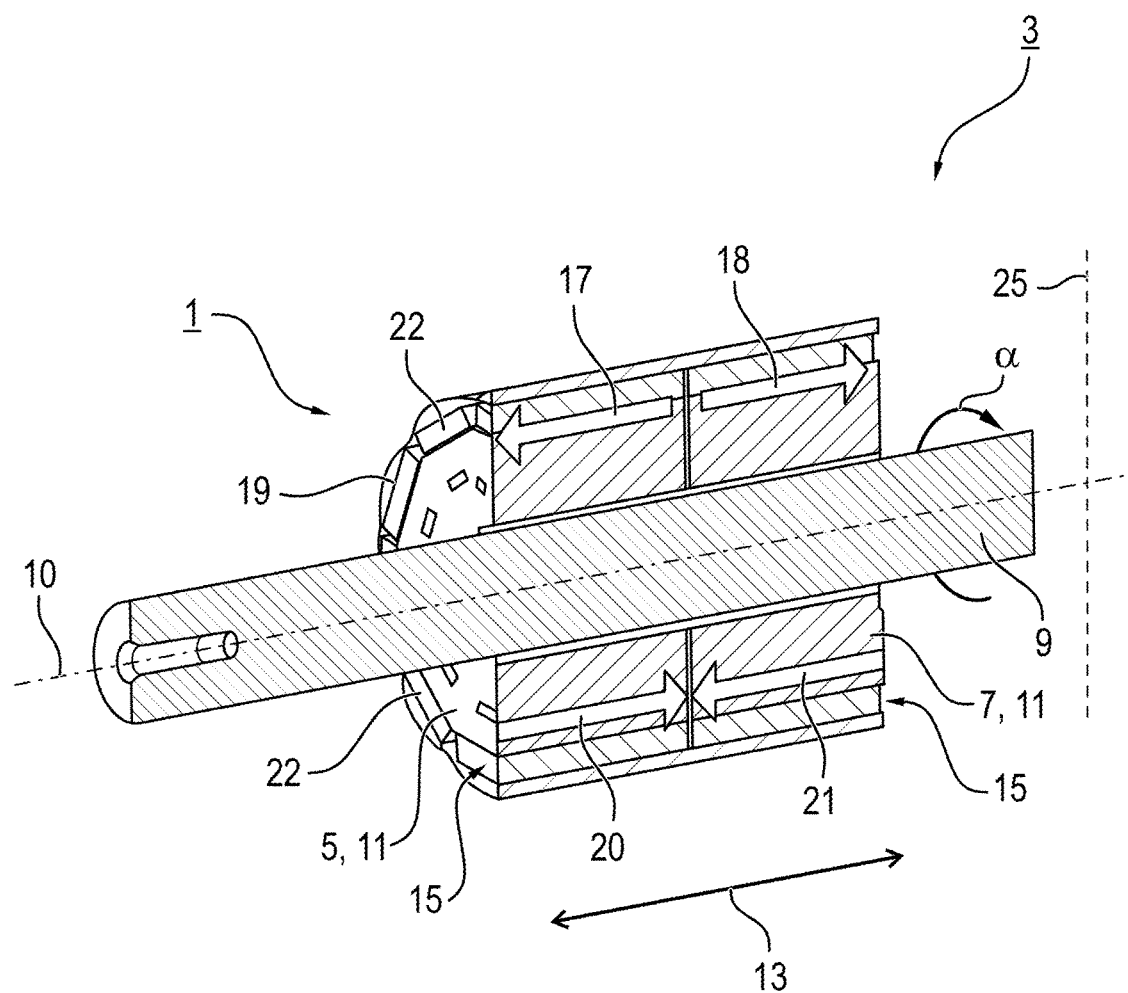

METHOD FOR PRODUCING A ROTOR AND ELECTRIC MACHINE HAVING A ROTOR

CROSS-REFERENCE TO RELATED APPLICATION

This application claims the priority, under 35 U.S.C. §119, of German application DE 10 2013 019 318.4, filed Nov. 20, 2013; the prior application is herewith incorporated by reference in its entirety.

BACKGROUND OF THE INVENTION

Field of the Invention

The invention relates to a method for producing a rotor, in particular for an electrical machine of a motor vehicle, and also to an electrical machine having a rotor.

Electric motors are used in various ways in a modern motor vehicle in order to drive different actuating elements. Electric motors are used, for example, as window winder drives, sliding roof drives or seat adjustment drives, as steering system drives, as radiator fan drives or as transmission actuators. Suitable electric motors generally have to provide a large torque at high power and, in particular, be ready to operate even at high and at low temperatures.

An electric motor usually has a stator which is provided with a field winding and which is arranged coaxially to a rotor having one or more permanent magnets. Both the rotor and the stator are commonly constructed as laminated cores, wherein stator teeth in stator slots, which are situated between the stator teeth, support the coils of the field winding. The coils are driven in order to generate a rotating field which creates a torque on the permanently excited rotor.

Published, non-prosecuted German patent application DE 10 2008 041 555 A1 discloses producing the rotor from stacked individual metal sheets or sheet metal layers in which recesses which are aligned with one another are made in order to form axial receiving pockets for permanent-magnet bodies. The permanent magnets are fixed in the radial direction by an interlocking connection into the recesses or receiving pockets. In order to axially secure the permanent magnets, that is to say to secure the permanent magnets in the direction of the rotation axis, at least one stop metal sheet is used. The stop metal sheet has a stop which overlaps the recesses in the other individual metal sheets.

The shape of the stop metal sheet differs from the other metal sheets. This adds to the production costs and complicates the assembly process.

SUMMARY OF THE INVENTION

The invention is accordingly based on a first object of specifying a method for producing a rotor, which method allows magnet bodies to be securely axially fixed in the receiving pockets of a rotor with production costs which are as low as possible. As a second object, the invention is based on specifying an electrical machine having a rotor in which the magnet bodies are securely axially fixed with comparatively low production costs.

According to the invention, the first object is achieved by a method for producing a rotor which can rotate about a rotation axis, in particular for an electrical machine of a motor vehicle. At least two rotor body elements are each provided with a number of receiving pockets which are made in the axial direction, and magnet bodies are in each case pressed into the receiving pockets in the rotor body elements with an axial press-in direction. The rotor body elements are joined to one another in such a way that the press-in directions of the magnet bodies point away from one another.

The starting point for finding the solution is initially the consideration that it is possible to fix magnet bodies by pressing them into axial receiving pockets in a rotor by a press connection. To this end, the magnet bodies and the receiving pockets form a press-fit in relation to one another. A pressing-in process at least partially elastically deforms the pressing partners. In the pressed-in state, the magnet bodies are held in the receiving pockets in a force-fitting manner by elastic return forces, in particular in the axial direction. However, particular investigations have shown that the pressed-in magnet bodies migrate out of the receiving pockets in the axial direction when they are subject to changes in temperature during operation of a rotor. This is undesired since, as a result, the performance of the motor is reduced or it may no longer be possible to ensure its ability to operate. In addition, migration of the magnet bodies in this way may lead to abnormalities in the acoustics.

However, further-reaching investigations have surprisingly shown that the magnet bodies which are pressed into the receiving pockets always migrate in a specific direction when they are subject to changes in temperature, specifically in that direction which is directed opposite to the press-in direction. The process of pressing the magnet bodies into the receiving pockets obviously creates material-induced asymmetry, so that the pressed-in magnet bodies are always pushed out of the receiving pockets in a manner directed opposite to the press-in direction due to the resulting micro-movements when they are subject to changes in temperature. Material is pushed into the receiving pockets in the press-in direction owing to the press-in process. An elastically deformed portion remains, this producing a return force opposite to the press-in direction when it is subject to changes in temperature.

The invention makes use of this finding. Undesired migration of the pressed-in magnet bodies out of the respective receiving pockets is reliably prevented when two rotor body elements are joined to one another in such a way that the press-in directions of the magnet bodies point away from one another. When they are subject to changes in temperature during operation, the magnet bodies migrate toward one another—opposite to their respective press-in direction—and therefore form a mutual stop. In this way, the asymmetry which is caused by the press-in process is used in order to hold the magnet bodies in an axially secure manner in the receiving pockets by a press connection.

By virtue of many investigations, it was possible to show that the magnet bodies which are pressed into the receiving pockets of two rotor body elements opposite to one another do not axially project even after passing through a large number of temperature shock cycles. The magnet bodies, which are pressed into the receiving pockets, of the rotor body elements which are joined to one another secure each other in the axial direction. In addition, the magnet bodies are automatically centered in the rotor in this way, this resulting in an increase in power of the motor.

The invention provides the great advantage that additional measures are no longer necessary in order to axially secure the magnet bodies in the receiving pockets. In particular, holding elements, holding metal sheets or other securing devices can be dispensed with. The pressed-in magnet bodies are held in the receiving pockets by a force-fitting connection and, owing to the utilized asymmetry, at the same time are secured against axially migrating outward. The material costs and costs of production are reduced in comparison to the prior art.

The number of rotor body elements used for producing a rotor is unlimited in principle. The invention can be transferred to more than two rotor body elements. In this case, it is advantageous when the press-in directions of the magnet bodies of the two rotor bodies which are arranged at the ends in the joined rotor point away from one another.

The invention is not restricted to complete press-fitting of the magnet bodies in the receiving pockets. It is sufficient when the press-fit between the magnet bodies and the receiving pockets is provided by holding elements or by holding lugs which are integrally formed on the receiving pockets. In this case, the force-fitting connection of the magnet bodies is established by at least partial elastic shaping or deformation of the holding elements or of the holding lugs. If the rotor is produced, as a laminated core, with a plurality of sheet metal layers, the holding elements or holding lugs can also be integrally formed only on some of the sheet metal layers.

In one variant, the rotor body elements are indirectly joined to one another by a shaft which passes through the two body elements. However, in addition or as an alternative, the rotor body elements can also be joined directly to one another by a force-fitting connection, an interlocking connection and/or a material connection.

The geometry of the receiving pockets is matched to the geometry and the dimensions of the magnet bodies. In particular, the cross section of the magnet bodies and of the receiving pockets can in each case taper radially outward, so that a secure radial seat is provided during operation. The magnet bodies are expediently provided as permanent magnets which are preferably produced from a rare-earth alloy, for example from a neodymium/iron/boron alloy or from a samarium/cobalt alloy.

In one advantageous refinement, the rotor body elements are provided with receiving pockets which are made by punching in an axial punching direction, wherein the magnet bodies are pressed-in opposite to the punching direction with an axial press-in direction. To this end, further-reaching investigations have shown that, in the event of the receiving pockets being punched, material-related asymmetry is already produced in the receiving pockets by the punching process. At the punched edge, the material on the inlet side of the punching tool is rounded by material removal (intake region). A punched burr remains on the outside (in the fracture region) downstream of a smooth sectional region. If the rotor body element, as a laminated core, is made up of a plurality of sheet metal layers, this asymmetry also applies for each individual sheet metal layer into which the respective recess is punched. Owing to the punched burr which is formed in the punching direction, the magnet bodies are preferably pressed-in opposite to the punching direction. In this way, the magnet bodies are axially held in the receiving pockets in a secure manner. Owing to the pressing-in operation, the metal sheet bends and the punched burr migrates in the press-in direction. This prevents migration of the magnet body opposite to the punching direction, that is in the press-in direction, this resulting in a secure press connection. This deformation of the punched burr during the process of pressing-in the magnet bodies opposite to the punching direction also contributes to the asymmetry which leads to directed migration of the magnet bodies when they are subject to changes in temperature during operation.

One or each rotor body element is preferably provided with receiving pockets which are made such that they are distributed along the circumference of a circular path. In this case, the receiving pockets are preferably distributed in a uniform manner in the circumferential direction and are uniformly spaced apart from one another. The magnetization direction of the magnet bodies is oriented parallel to the radial direction in this case. The number of poles of the electrical machine is given by the number of magnet bodies.

In an expedient refinement of the invention, the magnet bodies are pressed into the rotor body elements in each case with the same press-in direction, wherein at least one rotor body element is rotated about an axis, which is perpendicular to the rotation axis, before joining. A refinement of this kind is advantageous particularly in automated production methods for the respective rotor body elements, wherein the magnet bodies are all pressed into the identically provided rotor body elements or identically provided sheet metal layers with the same press-in direction. After production of the rotor body elements, a rotor body element is rotated about an axis, which is perpendicular to the rotation axis, and in each case joined to a rotated rotor body element. In this way, the press-in directions of the magnet bodies of the two rotor body elements point away from one another. Depending on the orientation of the magnet bodies and the magnetization which is to be correspondingly performed, it may be preferred to magnetize the magnet bodies only after they are pressed into the rotor body elements. This is the case particularly with a non-radial magnetization direction of the magnet bodies.

In a further advantageous refinement of the invention, the rotor body elements are arranged such that they are rotated in relation to one another through an offset angle α with respect to the rotation axis. Even with an arrangement of this kind, the press-in directions of the magnet bodies point away from one another and in this way prevent the magnet bodies from migrating out of the receiving pockets for operation-related reasons. However, the magnet bodies of the rotor body elements are rotated in relation to one another, this possibly having advantages in respect of the performance of the electrical machine.

The rotor body elements are expediently each provided, as laminated cores, with a plurality of sheet metal layers. In this case, the sheet metal layers of the rotor body elements are produced individually, stacked in an axial manner and then connected to one another in order to form the laminated core. The sheet metal layers can be adhesively bonded and/or welded to one another. The sheet metal layers can also be mechanically joined to one another by punched burrs or be clamped or screwed in the axial direction in order to form the laminated core.

The second object of the invention is achieved, according to the invention, by an electrical machine, in particular by an electric motor of a motor vehicle, containing a rotor which can rotate about a rotation axis and contains at least two rotor body elements with, in each case, a number of receiving pockets which are made in the axial direction. Wherein magnet bodies are pressed into each of the receiving pockets in the rotor body elements with an axial press-in direction, and the rotor body elements are joined to one another in such a way that the press-in directions of the magnet bodies point away from one another.

Preferred variant embodiments can be found in the dependent claims which are directed at an electrical machine. The advantages cited for the production method can be transferred mutatis mutandis in this case.

The receiving pockets are preferably made in the rotor body elements with an axial punching direction, wherein the magnet bodies are pressed-in opposite to the punching direction with an axial press-in direction.

The receiving pockets of a or each rotor body element are expediently each arranged such that they are distributed along the circumference of a circular path. In an advantageous variant embodiment, the rotor body elements are arranged such that they are rotated in relation to one another through an offset angle α with respect to the rotation axis. The rotor body elements are preferably each produced, as a laminated core, with a plurality of sheet metal layers.

Other features which are considered as characteristic for the invention are set forth in the appended claims.

Although the invention is illustrated and described herein as embodied in a method for producing a rotor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, sectional view of a rotor being part of an electrical machine according to the invention.

DETAILED DESCRIPTION OF THE INVENTION

Referring now to the single FIGURE of the drawing in detail, there is shown a rotor 1 as part of an electrical machine 3 containing two rotor body elements 5, 7 which are connected to one another. The rotor 1 is arranged in a rotationally fixed manner on a shaft 9 and, in the installed state, is arranged such that it can rotate about a rotation axis 10 coaxially in relation to a stator, not illustrated. The rotor body elements 5, 7 are produced, as laminated cores, from a plurality of individual sheet metal layers 11. The sheet metal layers 11 have not been individually illustrated in order to improve clarity.

The two rotor body elements 5, 7 contain a number of receiving pockets 15 which are made in an axial direction 13. The receiving pockets 15 are made during production of the individual sheet metal layers 11 by openings being punched into each individual sheet metal layer 11 in the axial direction 13. After the sheet metal layers 11 are connected, the axial receiving pockets 15 are produced in each case from the corresponding openings which are situated one above the other and are aligned with one another. The openings, that is the receiving pockets 15, are distributed in a rotationally symmetrical manner over the circumference of a circular path 19 of the respective rotor body element 5, 7. The respective punching directions 20, 21 for making the openings are shown.

Magnet bodies 22 which are each in the form of rod-like permanent magnets and are composed of an NdFeB alloy are pressed into the receiving pockets 15 in the rotor body elements 5, 7. The respective axial press-in direction 17, 18 is directed opposite to the axial punching direction 20 and, respectively, 21. Material-induced asymmetry results in the receiving pockets 15 owing to the punching process and owing to the subsequent press-in process of the magnet bodies 22. As a result, the pressed-in magnet bodies 22 migrate in a manner directed opposite to their respective press-in direction 17, 18 during operation of the rotor 1 when they are subject to changes in temperature.

After the magnet bodies 22 are pressed in, the rotor body elements 5, 7 are joined to one another such that the press-in directions 17, 18 of the magnet bodies 22 point away from one another or, in the present case, the punching directions 20, 21 point toward one another. To this end, in the case of rotor body elements 5, 7, which are provided with an identical orientation, the rotor body element 7 is, by way of example, rotated about an axis 25, which is perpendicular to the rotation axis 10, before the rotor body elements 5, 7 are joined. The result is accordingly the image illustrated in the FIGURE.

On account of material-induced asymmetry which results owing to the punching process and owing to the press-in process into the receiving pockets, the pressed-in magnet bodies 22 migrate opposite to their respective press-in direction 17, 18, that is in the direction of the punching directions 20, 21, during operation. In other words, the magnet bodies 22 of the rotor body elements 5, 7 move inward toward one another during operation. Each magnet body 22 therefore constitutes a securing element for the other paired magnet body 22. The pressed-in magnet bodies 22 are securely held in the receiving pockets 15 in an axial manner by a force-fitting connection. Additional securing elements are superfluous.

In addition, the two rotor body elements 5, 7 can also be arranged such that they are rotated in relation to one another through an offset angle α with respect to the rotation axis 10 in the variant embodiment shown. In the present case, the rotor body elements 5, 7 are joined to one another indirectly by the common shaft 9 by a press connection. It is also possible to mechanically join the two rotor body elements 5, 7 to one another separately before connecting them to the shaft 9 in a rotationally fixed manner.

The following is a summary list of reference numerals and the corresponding structure used in the above description of the invention:
1 Rotor
3 Electrical machine
5 Rotor body element
7 Rotor body element
9 Rotor shaft
10 Rotation axis
11 Sheet metal layer
13 Axial direction
15 Receiving pocket
17 Press-in direction
18 Press-in direction
19 Circular path
20 Punching direction
21 Punching direction
22 Magnet body
25 Vertical axis

The invention claimed is:

1. A method for producing a rotor which can rotate about a rotation axis, which comprises the steps of:
provinding at least two rotor body elements with a number of receiving pockets made therein in an axial direction;
making the receiving pockets in the rotor body elements by punching parts of the rotor body elements in an axial punching direction;

pressing magnet bodies in each case into the receiving pockets in the rotor body elements opposite to the axial punching direction along an axial press-in direction; and joining the rotor body elements to one another such that axial press-in directions of the magnet bodies point away from one another.

2. The method according to claim 1, which further comprises providing at least one of the rotor body elements with the receiving pockets such that the receiving pockets are made such that the receiving pockets are distributed along a circumference of a circular path.

3. The method according to claim 1, which further comprises pressing the magnet bodies into the rotor body elements in each case with the same press-in direction, and at least one of the rotor body elements is rotated about an axis, which is perpendicular to the rotation axis, before joining, so that the axial press-in directions of the magnet bodies point away from one another.

4. The method according to claim 1, which further comprises disposing the rotor body elements such that the rotor body elements are rotated in relation to one another through an offset angle α with respect to the rotation axis.

5. The method according to claim 1, which further comprises providing the rotor body elements as laminated cores having a plurality of sheet metal layers.

6. The method according to claim 1, wherein the rotor is a rotor of an electrical machine of a motor vehicle.

7. An electrical machine, comprising:

a rotor which can rotate about a rotation axis and containing at least two rotor body elements with, in each case, a number of receiving pockets made therein in an axial direction, said receiving pockets being made in said rotor body elements with an axial punching direction, and magnet bodies pressed into each of said receiving pockets in said rotor body elements with an axial press-in direction opposite to the axial punching direction, said rotor body elements joined to one another such that axial press-in directions of said magnet bodies point away from one another.

8. The electrical machine according to claim 7, wherein said receiving pockets of said rotor body elements are each disposed such that said receiving pockets are distributed along a circumference of a circular path.

9. The electrical machine according to claim 7, wherein said rotor body elements are disposed such that said rotor body elements are rotated in relation to one another through an offset angle α with respect to the rotation axis.

10. The electrical machine according to claim 7, wherein said rotor body elements are each produced, as a laminated core, with a plurality of sheet metal layers.

11. The electrical machine according to claim 7, wherein the electrical machine is an electric motor of a motor vehicle.

\* \* \* \* \*